United States Patent [19]

James et al.

[11] Patent Number: 5,201,574

[45] Date of Patent: Apr. 13, 1993

[54] CLEAT RETAINING BOLT AND NUT FOR VEHICLE ENDLESS TRACK

[75] Inventors: M. Elmer James, Mendon; Micheal G. Beeley, Logan, both of Utah

[73] Assignee: Logan Manufacturing Company, Logan, Utah

[21] Appl. No.: 844,769

[22] Filed: Mar. 2, 1992

[51] Int. Cl.$^5$ .............................................. B62D 55/26
[52] U.S. Cl. ................................. 305/35 EB; 305/54
[58] Field of Search ................... 305/35 R, 35 EB, 39, 305/51, 53, 54, 55; 411/84, 85, 966; 198/728, 731

[56] References Cited

U.S. PATENT DOCUMENTS

| | | | |
|---|---|---|---|
| 3,390,924 | 7/1968 | Bumbaugh | 305/35 EB |
| 3,765,731 | 10/1973 | Kilbane, Jr. | 305/35 R |
| 3,829,174 | 8/1974 | Thomas | 305/35 EB |
| 3,883,190 | 5/1975 | Kilbane, Jr. | 305/35 EB |
| 4,059,315 | 11/1977 | Jolliffe | 305/35 R |
| 4,281,882 | 8/1981 | van der Lely | 305/35 R |

Primary Examiner—Russell D. Stormer
Attorney, Agent, or Firm—A. Ray Osburn

[57] ABSTRACT

The cleat assembly for the endless track of a vehicle, having a mounting bolt and nut combination wherein the threaded portion of the bolt is located remotely from the area of bending failure responsible for bolt fracture and cleat failure. An elongate bolt is used with threads at its ends remote from the belt, in combination with a nut having an unthreaded bore with threads only at one end thereof, the nut spanning from the bolt threads to bear upon the grouser.

3 Claims, 6 Drawing Sheets

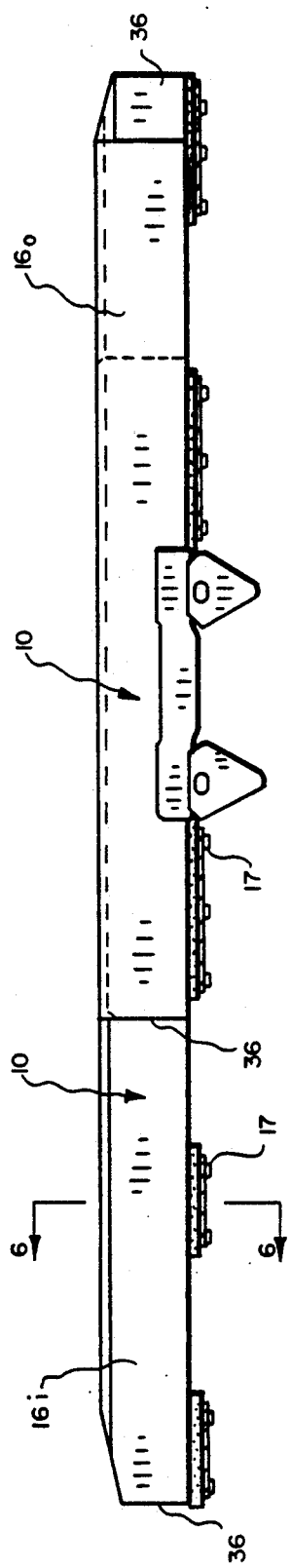
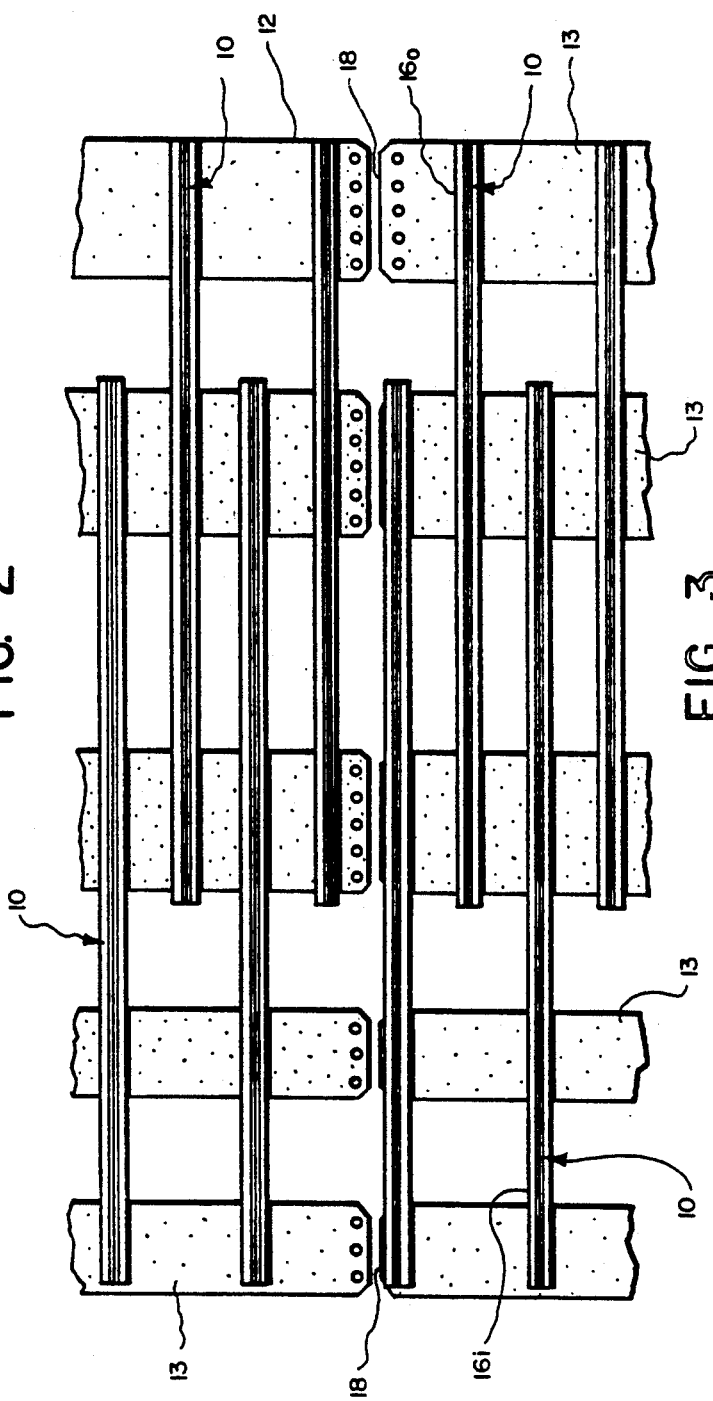

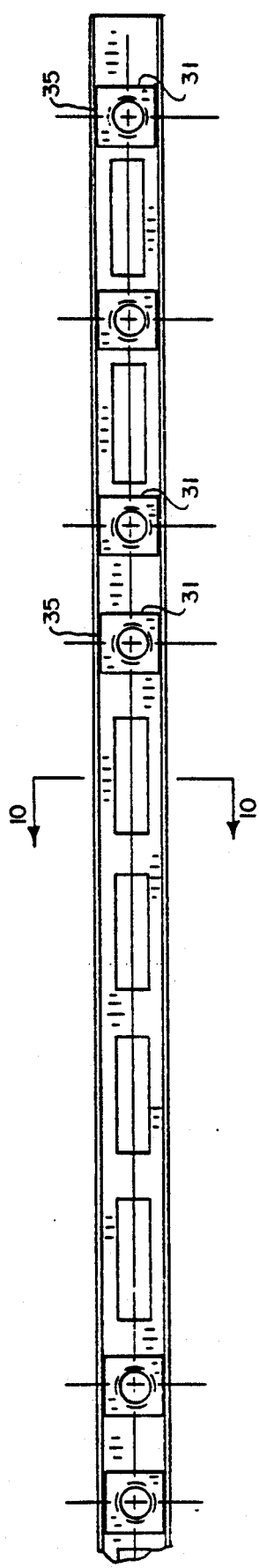
FIG. 7
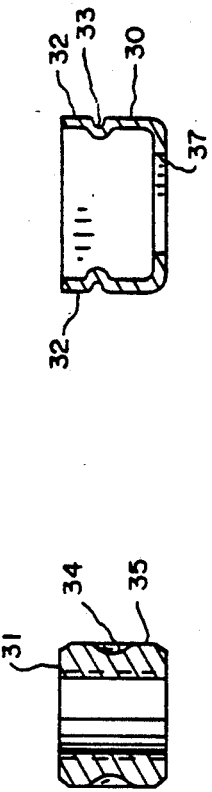
FIG. 10
FIG. 9
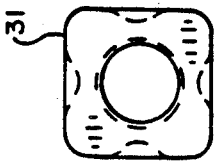
FIG. 8

CLEAT RETAINING BOLT AND NUT FOR VEHICLE ENDLESS TRACK

BACKGROUND OF THE INVENTION

1. Field

The field of the invention is endless track assemblies for snow grooming vehicles, and more particularly the cleat assemblies thereof, including structures for fastening the cleats to the flexible plastic belting of such tracks.

2. State of the Art

Snow groomer vehicles use endless tracks made up of flexible plastic belts made continuous by lacing their ends together. Actual lacing thread may be used, although lacing joint assemblies are more commonly employed, being a combination of metallic hinge plates and an associated hinge pin. The snow grooming vehicle commonly has an endless track assembly on each of its sides, each comprising a number of fabric reinforced plastic belts. The belts are spaced apart to provide a broad base for the track while utilizing minimum amounts of belting. Steel cleat assemblies are bolted across the individual belts at intervals, tieing them together into a track assembly. Each assemblied track is engaged by a power-transmitting sprocket wheel, which forces the belts to travel together around a set of guiding wheels called bogies. The powered belt imparts horizontal shear forces to the cleats, which engage the snow to propel the vehicle. Extensive development has gone into the design of the elongate cleat members, with the objectives of providing maximum forward traction, along with substantial resistance to side slipping. Cleat constructions are disclosed in U.S. Pat. Nos. 3,765,731, 4,560,211, 4,281,882 and 4,059,315. Typically, the ground contacting cleat, also called a "grouser", is fastened to the outside of the flexible belting by bolts and nut assemblies installed in matching holes in the grouser, the belt, and a metal backing plate on the inside of the belt. A large number of bolt and nut assemblies are required to spread the high shearing forces among the belt holes. The horizontal force on the ground engaging part of the cleat also results in high moment loads which must be resisted by the stems of the bolts. Failure of the bolts in bending is a too frequent common occurrence, and is largely caused by the moment force applied to the portion of the stem at the junction of the threads and the unthreaded shank, resulting in stress concentration.

A cleat assembly design of greater strength is needed, particularly incorporating a bolt and nut assembly not susceptible to bending fracture at the threaded portions.

BRIEF SUMMARY OF THE INVENTION

The disadvantages of the prior art are substantially overcome by providing an improved cleat retaining bolt and nut combination, wherein the bolt has an elongate stem unthreaded except for a short portion at its end remote from the belt. Except for the short end internally threaded portion, the nut is bored to clear the bolt. With the internal threads engaging those of the bolts, the nut spans therefrom to bear upon the grouser plate around the bolt. When the nut and bolt combination is installed through the matching mounting holes in the cleat backing plate, belt and grouser, the maximum bending moment is resisted by the unthreaded shank of the bolt. Little if any bending stress is imposed upon the threaded portion of the bolt stem. Thus, the major source of bolt failure in endless track cleats is eliminated in the present invention.

Preferably, a nut retaining member is used in conjunction with the inventive bolt and not combination. A downwardly opening channel is provided, with bores spaced apart through its web to receive the mounting bolts and the upper portion of the nut. Downstanding channel legs carry a pair of opposed inward projections at each clearance hole. The bottom portion of the corresponding mounting nuts are preferably square, and each has a pair of opposed parallel faces, each carrying a depression placed to accept the inward projections of the channel legs. The nuts are forcibly inserted into the channel and each retained in proper location for engagement by the corresponding mounting bolt. Using the channel member with installed nuts, a single workman may install the entire cleat assembly by applying appropriate tools only to the bolt heads on the side of the belt opposite the grouser plate. The nut retaining channel, with properly spaced nuts is inserted as a unit through one of the open ends of the closed box grouser plate. Proportioned to avoid contact with the grouser plate, the channel carries no clamping load and need not be highly hardened.

When the nut retaining member is used, the cleat assembly may utilize a grouser plate in structurally strong closed box form, the need for direct access to each individual mounting nut being eliminated.

It is therefore the principal object of the invention to provide a nut and bolt assembly for an endless track for a snow grooming vehicle, with substantially eliminates bolt failure. Another object is to provide such an assembly which is easily installed upon the belt, and allows improved grouser plate designs to be used.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
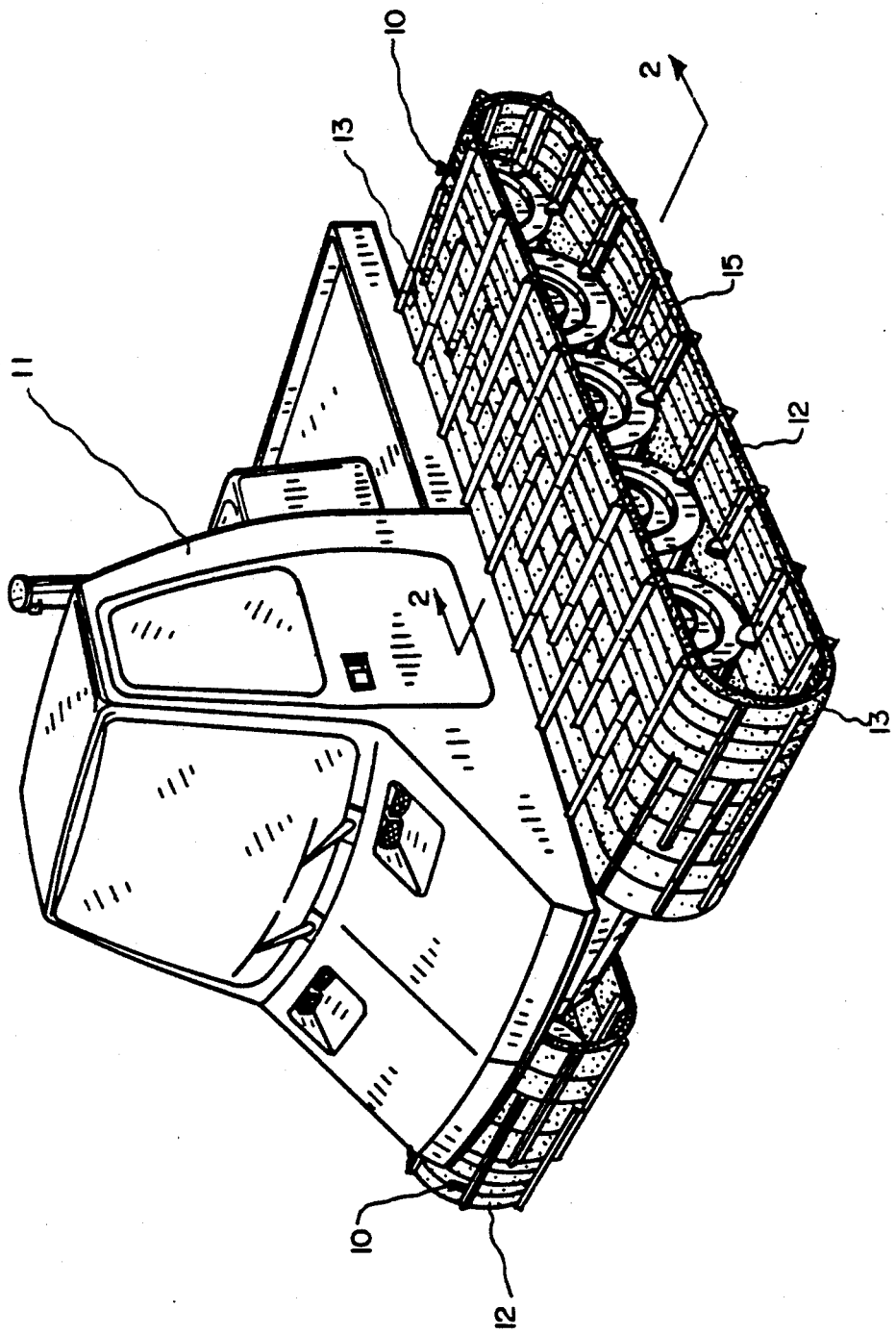
FIG. 1 is a perspective representation of an endless track vehicle incorporating the cleat nut and bolt of the invention, drawn to a reduced scale, FIG. 2 a cross sectional view of the endless track of FIG. 1, taken along line 2—2 thereof, drawn to a reduced scale larger than that of FIG. 1, FIG. 3 a top plan view of a fragment of the endless track of FIG. 1, drawn to a reduced scale slightly smaller that of FIG. 2, FIG. 4 a plan view of a fragment of one of the individual flexible belts of the endless track of FIG. 1 showing the belt lacing joint of one of the belts thereof, drawn to a reduced scale somewhat larger than that of FIG. 2, FIG. 5 a vertical cross sectional view of the lacing joint of FIG. 4, taken along line 5—5 thereof, drawn to the same scale, FIG. 6 a cross sectional view of a fragment of the endless track of FIG. 1, taken along line 6—6 of FIG. 2, drawn to substantially full scale, FIG. 7 a perspective view of a fragment of the torque nut retaining channel of the invention, drawn to approximately one-half full scale, FIG. 8 a plan view of the torquing nut of the invention, drawn to full scale, FIG. 9 a cross sectional view of the torquing nut of FIG. 8, taken along line 9—9 thereof, drawn to the same scale, FIG. 10 a cross sectional view of the nut retaining channel of FIG. 7, taken along line 10—10 thereof, drawn to an enlarged scale, FIG. 11 a cross sectional view of a fragment of a prior art endless track assembly, drawn to approximately the scale of FIG. 6, FIG. 12 a side view of the bolt of the bolt and nut combination of the invention, drawn to substantially full scale, FIG. 13 a vertical cross sectional view of the nut of the bolt and nut combination of the invention, drawn to the scale of FIG. 12, FIG. 14 a bottom view of the nut of FIG. 13, taken along line 14—14 thereof, drawn to the same scale, and FIG. 15 a cross sectional view of a fragment of the endless track of FIG. 1, showing a cleat assembled upon the belting of the track, incorporating the inventive cleat retaining bolt and nut, drawn to substantially full scale.

An endless belt track, with a multiplicity of cleat assemblies 10 in accordance with the invention, is shown in FIG. 1 installed upon an off-road vehicle 11. Vehicle 11 may, for example, be used to propel a snow tiller dr other ski run grooming implement. The track assembly 12 comprises a number of belts 13 of flexible fiber reinforced plastic secured spaced apart by the laterally directed cleat assemblies 10. Lacing assemblies 14 connect opposing ends of each belt 13, making track 12 endless. Track 12 is supported on the vehicle by wheels 15, one being a drive sprocket engaging the cleats 10. Each cleat 10 has a ground engaging, shaped plate 16 called a grouser. Grousers 16 have been employed in many configurations, each calculated to provide improved traction with the snow, prevent side slip of the vehicle, or otherwise perform more desirably and efficiently. However, the present invention is not concerned primarily with traction developing qualities, but with improved methods for fastening the grousers to the belts 13. However, the fastening provisions of the invention also permit greater freedom in grouser design, as explained below.

Figure 4:
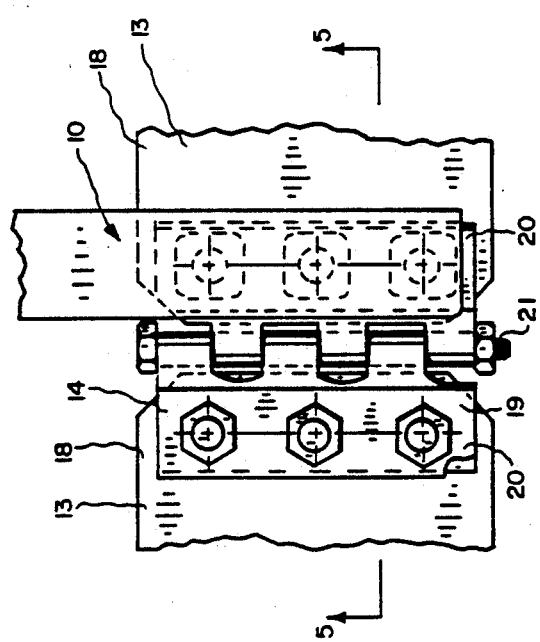
Figure 5:
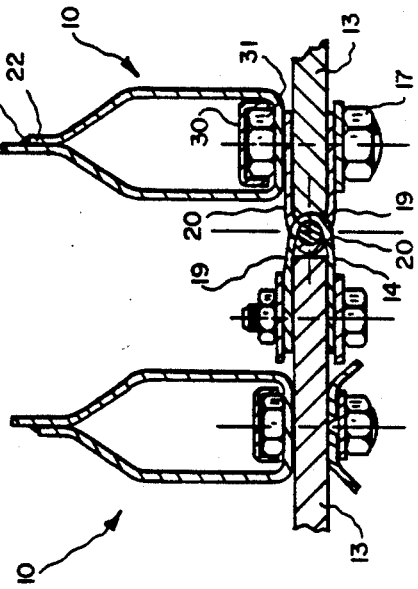
Figure 11:
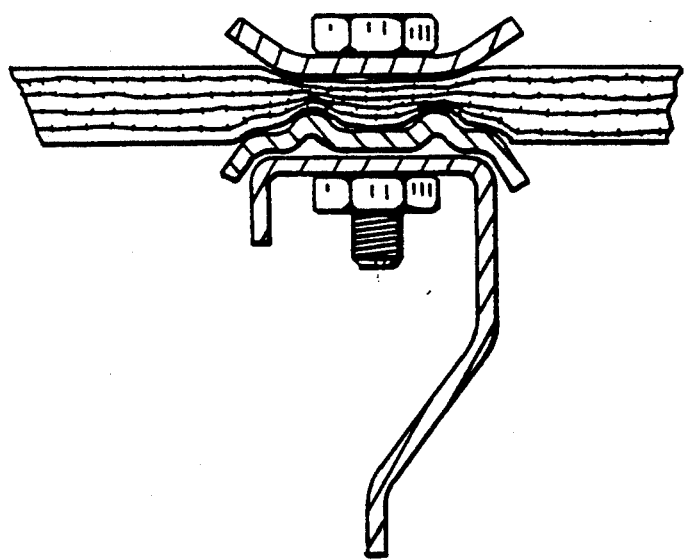
Figure 15:
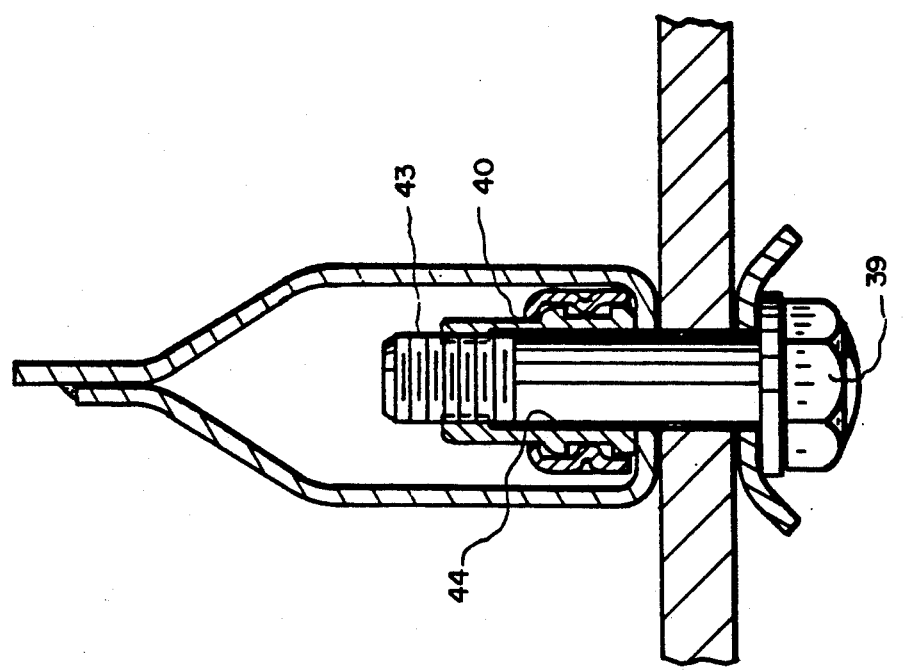
Figure 13:
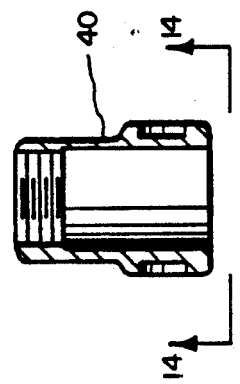
Figure 14:
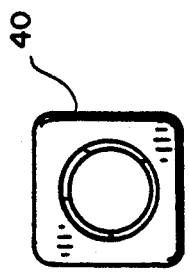
Figure 12:
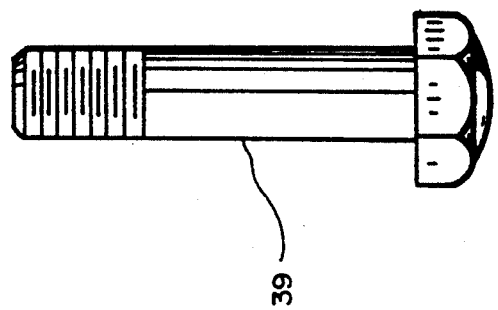

Illustrated track 12 has three inside belting strips 13 used with a pair of narrower outside strips 13. (FIG. 3) Lateral inside grouser plates 16i are secured to the three inside belts 13 by bolts 17. Outside grouser plates 16o are bolted spanning the pair of outside belts 13 and the centermost two of the inside belts 13, laterally overlapping inside grousers 16i. Wheel guide assemblies 18 are bolted projecting from the overlapping grouser portions between belts 13. Belt ends 18, shown free in FIG. 3, are in fact attached by lacing hinge assemblies 19. (FIGS. 4 and 5) Hinge plates 20 are bolted through holes, not shown, in the belt ends, and are connected by a hinge pin 21. Bolts 17 are sometimes used to secure both the hinge plate 20 and one of the grouser plates 16.

Grouser plate 16 is "U" shaped at the belts 13 and bolts 17, with side portions formed to meet at full length welds 23. It is possible to utilize this extremely rigid, strong box construction because, as will be evident from the following, access to the individual grouser mounting bolts is not necessary. Spaced apart grouser mounting holes 24 mate with corresponding belt mounting holes 25. A belt backing plate 26 extends laterally across each belt strip, preferably stiffened by downwardly bent edge portions 28, avoiding damage to the flexing belt structure. Preferably, hardened locking washer 29 accompanies each hardened mounting bolt 17, helping to withstall any loosening from long term creep of the material of belts 13.

Inside each box grouser 16, extending its full length, is a downwardly opening elongate channel member 30. A torquing nut 31 is prepositioned at each mounting bolt location, secured within channel legs 32. Opposing pairs of inwardly projecting dimples 33 engage matching depressions 34 in opposing, parallel, side faces 35 of each nut. (FIGS. 8 and 9)

To install cleat assembly 10 upon endless track 12, each grouser 16 is placed across appropriate associated belts with the grouser mounting holes 24 in alignment with belt mounting holes 25. Then, channel 30 with spaced nuts 31, is inserted through an open grouser end 36 with the nuts each aligned with belt and grouser mounting holes The mounting bolts 17 are then installed through backing plates 26, belts 13 and grousers 16 to engage the threads of torquing nuts 31. In practice. It is advantageous to first engage tire guide bolts 17g, to firmly position channel and nuts upon the grousers, before attempting to align and engage the belt securing bolts 17.

The nut depressions 34 are preferably sized to allow nuts 31 to float a small amount for alignment with bolts 17. Nut rotation during cleat assembly is resisted by channel legs 32. (FIG. 7) Bolt clearance hole 37 in the channel web 38 isolates channel 30 from the vehicle driving load resisting cleat structure. Channel 30 does not contact grouser 16, while nuts, bolts, grouser and belt are all in forcible frictional contact. Accordingly, channel 30 may be of unhardened, unalloyed steel.

Figure 6:
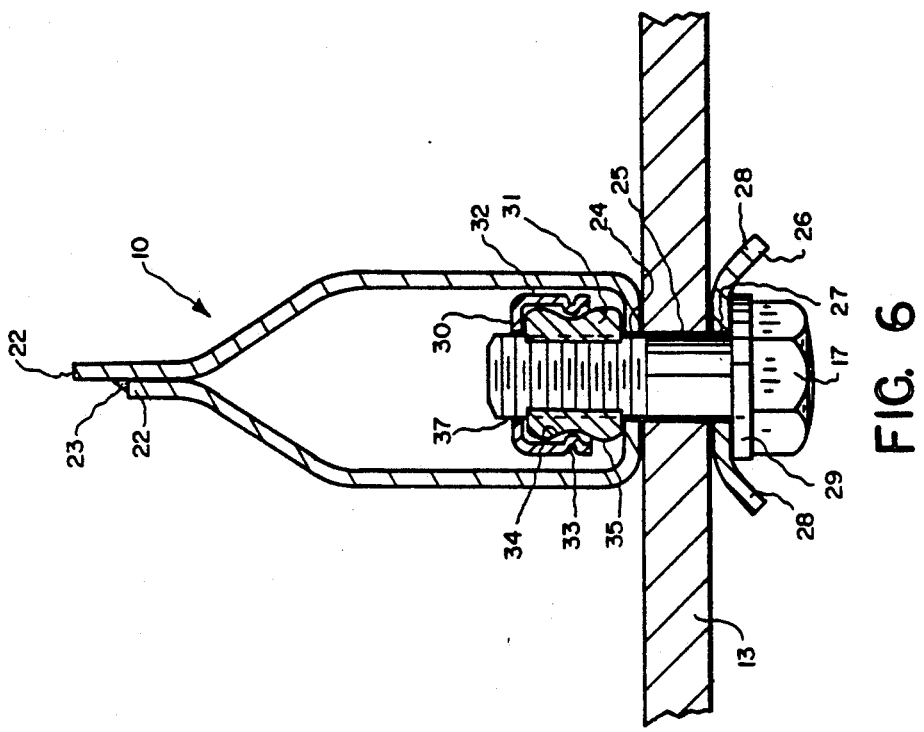

Preferably, the mounting bolts 17, and associated nuts 31 are replaced in cleat 10 by lengthened bolts and nuts 39 and 40 respectively. (FIGS. 12-15) As seen in FIG. 6, use of bolt 17 along with nut 31 places the bolt threads 41 dangerously near the position of maximum bending moment upon bolt 17. The bending moment is imposed by the horizontal shear load upon grouser 16 during operation of the vehicle, and is near maximum near grouser mounting holes 24. Accordingly, fracture of bolt 17 at the juncture of threads 41 and unthreaded shank 42 sometimes results in practice. In contrast, use of the long, unthreaded shank, bolt 39 with nut 40 places the bolt threads 43 distantly from this position. Lengthened nut 40 has a bore 44 with a threaded portion 43 only at its end distant from the grouser-belt interface, which is joined with an unthreaded, smooth bolt clearing portion 45. As with bolt 17, a hardened lock washer 29 is preferably employed between bolt head 46 and backing plate 26. In both instances, a locking compound, not indicated, is preferably used upon the mating bolt and nut threads. A nut retaining channel 30 is preferably provided to facilitate the assembly of the cleat 10 upon the belt 13. However, channel 30 in this instance provides clearing holes 47 for the upper portion 48 of long nut 40, while channel legs 32 extend downward about opposing sides of a lowermost, square portion 49 in contact with grouser 16. Again, dimples 33 are provided in the downstanding legs, along with matching bolt head depressions 34.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters Patent is:

1. A cleat to be mounted upon the flexible belting of a vehicle endless track, the track comprising at least one endless flexible belt carrying longitudinally spaced sets of holes for mounting the cleat transversely to the belt, said cleat comprising:

an elongate grouser plate having a generally planar belt contacting portion, having mounting holes therethrough matching the holes of one of the sets carried by the belt;

an elongate backing plate laterally spanning the belt, and having holes matching the mounting holes of the grouser;

a mounting bolt operable through each of the matching holes to secure the backing plate, the belt and the grouser together, said bolt having an enlarged head portion and an elongate unthreaded shank portion extending a substantial distance beyond the grouser mounting hole to join with an end portion carrying external threads; and a torque nut having an elongate body spanning from the bolt threads to the grouser, having a longitudinal bore therethrough with an internally threaded end portion joining an unthreaded, shank clearing portion, the latter spanning from the threaded portion to an opposite, grouser-bearing end thereof.

2. The cleat of claim 1, further comprising:

an elongate rigid member retaining the torque nuts non-rotatably, spaced apart in matching relationship to the grouser mounting holes.

3. The cleat of claim 2, wherein:

the nut retaining member comprises an elongate channel member having a pair of parallel leg portions extending from a connecting web member toward the belt contacting portion of the grouser plate; wherein a grouser bearing end portion of each nut carries at least one pair of opposed parallel faces spaced apart to allow closely clearing insertion of the nut between the channel leg portions,, each face carrying a depression;

an opposite threaded end, portion of the nut joining with the grouser bearing portion thereof, having a circular cross section;

a threaded end portion receiving bore through the web of the channel at each cleat mounting hole, and a pair of opposed, inwardly projecting, dimples at each nut receiving hole; so that the nuts may be inserted into and retained within the channel in bolt receiving positions.

* * * * *